(12) United States Patent
Woehler et al.

(10) Patent No.: US 10,766,328 B2
(45) Date of Patent: Sep. 8, 2020

(54) SPRING STRUT SUPPORT MOUNT

(71) Applicant: Contitech Vibration Control GmbH, Hannover (DE)

(72) Inventors: Stefan Woehler, Edemissen (DE); Jirka Busch, Jeversen (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 15/918,975

(22) Filed: Mar. 12, 2018

(65) Prior Publication Data

US 2018/0215228 A1 Aug. 2, 2018

Related U.S. Application Data

(63) Continuation of application No. PCT/EP2016/064768, filed on Jun. 27, 2016.

(30) Foreign Application Priority Data

Sep. 10, 2015 (DE) .................. 10 2015 217 326

(51) Int. Cl.
*B60G 15/00* (2006.01)
*B60G 15/06* (2006.01)
(Continued)

(52) U.S. Cl.
CPC ......... *B60G 15/067* (2013.01); *B60G 13/003* (2013.01); *B60G 15/00* (2013.01);
(Continued)

(58) Field of Classification Search
CPC ............. B60G 15/067; B60G 13/003; B60G 2204/128; B60G 2204/45; F16B 39/282;
(Continued)

(56) References Cited

U.S. PATENT DOCUMENTS 2,756,045 A * 7/1956 Savory .................. B62K 25/06
267/177
7,896,321 B2 * 3/2011 Nakashima ........... F16F 13/007
267/175

(Continued)

FOREIGN PATENT DOCUMENTS

DE 7710534 U1 7/1977
DE 3619942 A1 12/1987
(Continued)

OTHER PUBLICATIONS

International Search Report dated Oct. 4, 2016 of international application PCT/EP2016/064768 on which this application is based.

*Primary Examiner* — Nkeisha Smith
(74) *Attorney, Agent, or Firm* — Gregory Adams; David L. Cate

(57) ABSTRACT

The invention is directed to a spring strut support mount, including a damper element and a mount housing having a first and a second housing member, wherein the housing members can be threadably engaged by a thread so as to encompass the damping element. The housing members have a detent arrangement which permits a screwing action but prevents a loosening of the thread connection. The invention provides for improving a spring strut support mount such that the housing members cannot loosen from one another during operation. The housing members have a detent arrangement which permits a screwing action but prevents a loosening of the thread connection.

5 Claims, 2 Drawing Sheets

(51) Int. Cl.
  *F16F 9/54*    (2006.01)
  *F16B 39/282*  (2006.01)
  *B60G 13/00*   (2006.01)

(52) U.S. Cl.
  CPC .......... *B60G 15/068* (2013.01); *F16B 39/282* (2013.01); *F16F 9/54* (2013.01); *B60G 2204/128* (2013.01); *B60G 2204/45* (2013.01); *B60G 2204/4502* (2013.01); *F16F 2226/044* (2013.01); *F16F 2230/0005* (2013.01); *F16F 2230/0041* (2013.01)

(58) Field of Classification Search
  CPC ................... F16F 9/54; F16F 2226/044; F16F 2230/0005; F16F 2230/0041
  See application file for complete search history.

(56) References Cited

U.S. PATENT DOCUMENTS

| | | | | |
|---|---|---|---|---|
| 7,926,822 B2 * | 4/2011 | Ohletz | ................... | B60G 11/16 |
| | | | | 280/124.179 |
| 9,694,643 B2 * | 7/2017 | Mersmann | ........... | B60G 17/021 |
| 9,707,819 B2 * | 7/2017 | Dobre | .................. | B60G 15/062 |
| 9,744,826 B2 * | 8/2017 | Cox | ..................... | B60G 15/063 |
| 9,987,897 B2 * | 6/2018 | Mersmann | ............. | B60G 11/16 |

FOREIGN PATENT DOCUMENTS

| | | |
|---|---|---|
| DE | 10332801 A1 | 2/2005 |
| DE | 10335956 A1 | 2/2005 |
| FR | 2919909 A1 | 2/2009 |

\* cited by examiner

SPRING STRUT SUPPORT MOUNT

CROSS REFERENCE TO RELATED APPLICATIONS

This application is a continuation application of international patent application PCT/EP2016/064768, filed Jun. 27, 2016, designating the United States and claiming priority from German application 10 2015 217 326.7, filed Sep. 10, 2015, and the entire content of both applications is incorporated herein by reference.

FIELD OF THE INVENTION

The invention relates to a spring strut support mount, comprising a damper element and a mount housing, having a first and a second housing member, wherein the housing members can be screwed together, by a thread, so as to encompass the damping element.

BACKGROUND OF THE INVENTION

A wide variety of spring strut support mounts have long been known. They serve for the elastic fastening of the piston rods of a vibration damper to a body of a motor vehicle such that good vibration damping is ensured. To ensure the durability of the damping elements along with good force transmission, the damping elements are normally at least partially embedded in a housing.

DE 77 10 534 U presents a bearing of this type, wherein here, the damping element is only partially encompassed by the metal sheet formed in the manner of a housing. DE 103 35 956 A1 has disclosed a spring construction in which the damping element is enclosed in a two-part circular housing. In one embodiment of this publication, the housing can be screwed together by a thread, such that the damping element can be fixedly clamped between the housing members. In the case of this teaching, however, security against loosening is provided only by the preload of the damping element, such that there is the risk that the screw connection can loosen. Both publications DE 77 10 534 U and DE 103 35 956 A1 are incorporated herein by reference.

SUMMARY OF THE INVENTION

It is an object of the invention to provide a spring strut support mount of the type mentioned above such that the housing members cannot loosen from one another during operation.

The object is achieved in that the housing members have a detent device or arrangement which permits a screwing action but prevents a loosening of the thread. By means of a detent device of this type, it is possible for the threaded connection of the housing members to be realized so as to be secured against loosening even in the case of low preloads of the damping element.

In one embodiment of the invention, the detent device is arranged on the circumference of the housing members, wherein the detent device is of two-part form, and a first part of the detent device has, distributed on the circumference, lugs which point into the interior of the housing, and a second part of the detent device has radially inwardly pointing grooves which are distributed on the circumference of the second part of the detent device correspondingly to the lugs of the first part, the first and second parts of the detent device are coordinated with one another such that the lugs of the first part of the detent device engage into the grooves of the second part of the detent device in the assembled state of the housing members, wherein the grooves have, at one side in the circumferential direction, in each case one slope which rises from the inside to the outside.

A detent device of the stated type makes it possible for the damping element to be preloaded in the housing in an exact manner without the risk of the threaded connection of the housing members loosening. Owing to the configuration of the grooves with a slope, it is easily possible for the lugs to be rotated onward from one groove to the next, because the elasticity of the materials permits a corresponding elastic deformation of the detent device. Since the slope is provided only on one side, it is the case, by contrast, that a backward rotation of the lug part of the detent device against the groove part is not possible without destruction of the detent device. A high degree of security against loosening of the threaded connection is thus realized.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
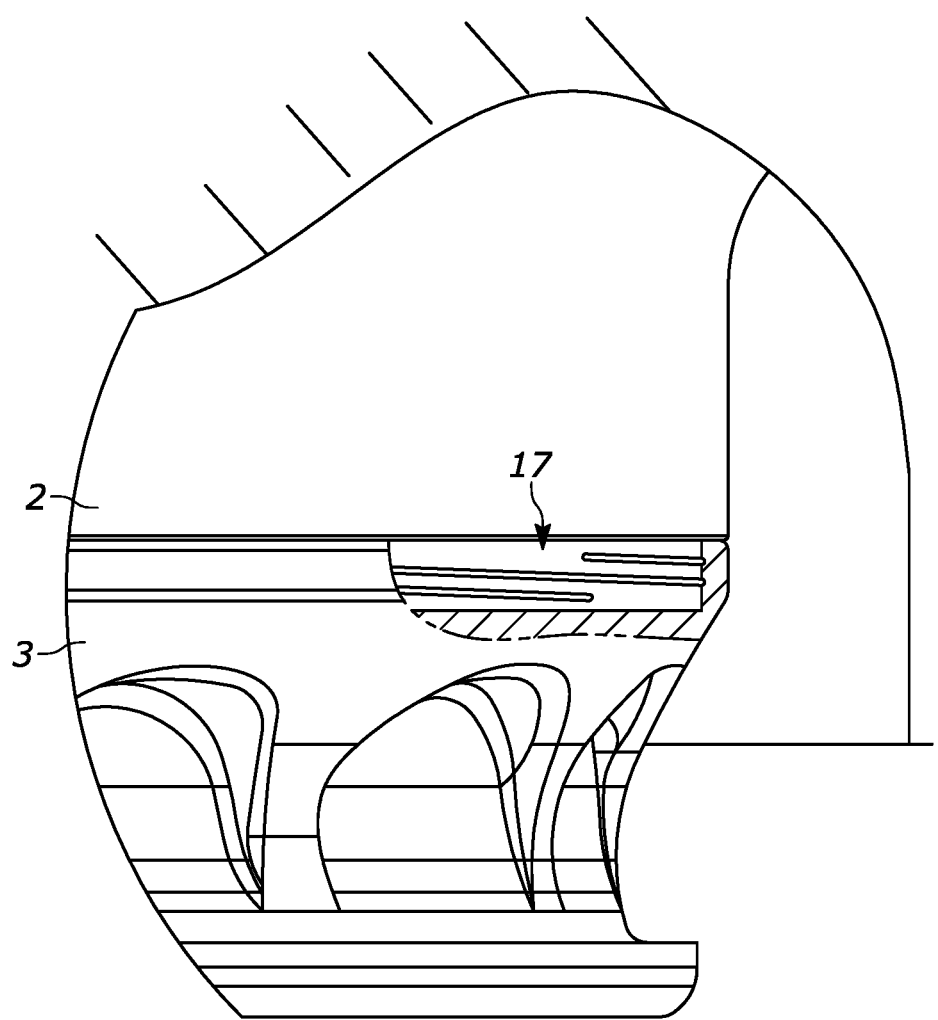
FIG. 1 shows a lower section of a spring strut support mount in a partial section view; and, FIG. 1A is a detail enlarged view showing a threaded connection between the upper and lower housing members of the spring strut.
FIG. 1B shows a portion of a spring strut mount having example threads.

The spring strut support mount 1 has an upper housing member 2 and a lower housing member 3. The housing members 2 and 3 can be screwed together in an axial direction and include a damping element (not visible here) which is clamped between the housing members 2 and 3. The upper housing member 2 has a detent profile 5 on its lower end 4.

The lower housing member 3 has a further detent profile 7 on its upper end 6. The detent profile 7 exhibits substantially a lug 8, which faces toward the upper housing member 2 and which has a slope 9 and a steep face 10.

The detent profile 5 of the upper housing member 2 has a first sloping flank 11, which corresponds to the pitch of the thread (not shown here) of the threaded connection of the housing members. The sloping flank 11 is followed by a slope 12, the pitch of which is opposite to that of the sloping flank 11. There subsequently follows a detent groove 13, the shape of which corresponds to the lug 8 of the detent profile 7.

During the screwing movement of the housing members 2 and 3, the housing members 2 and 3 move relative to one another as indicated by arrows 14 and 16 showing first and second circumferential directions of rotation. The housing members 2 and 3 conjointly define an interface 18 whereat the housing members act upon each other. Here, the lug 8 can come into contact with the sloping flank 11 until it abuts with its slope 9 against the slope 12. During a further screwing movement, the slopes 9 and 12 slide on one another, which is possible owing to elasticity of the housing members 2 and 3 and of the play, which is to be maintained exactly, in the thread turns. At the end of the screwing movement, the lug 8 slides into the corresponding detent groove 13. Owing to the shape of the detent groove 13 and the steep face 10 of the lug 8, a backward rotation of the housing member 2 relative to the housing member 3 is no longer possible, which prevents an inadvertent opening of the spring strut support mount.

The spring strut support mount of the applicant's invention includes a detent arrangement which permits a screwing action in the first circumferential direction of rotation 14 and prevents a loosening of the threaded connection in a second circumferential direction of rotation 16 opposite the first circumferential direction of rotation 14. The first and second housing members (3, 2) conjointly define an interface 18.

The detent arrangement is disposed at this interface 18 and is a two-part detent arrangement including a first part 7 on the first housing member 3 and a second part 5 on the second housing member 2. The first part 7 includes a first periphery at the interface 18 and has a lug 8 disposed on the first periphery directed into the interior of the housing. The second part 5 includes a second periphery at the interface 18 and has a groove formed in the second periphery directed radially inwardly with the groove corresponding to the lug 8 of the first part 7 of the detent arrangement.

The first and second parts (7, 5) of the two-part detent arrangement are matched to each other so as to cause the lug 8 of the first part to engage in the groove 13 of the second part 5 when assembling the housing members (3, 2). The groove 13 has at one side thereof an increasing slope 9 rising from inside to outside viewed in one of the first and second circumferential directions.

Figure 1B:
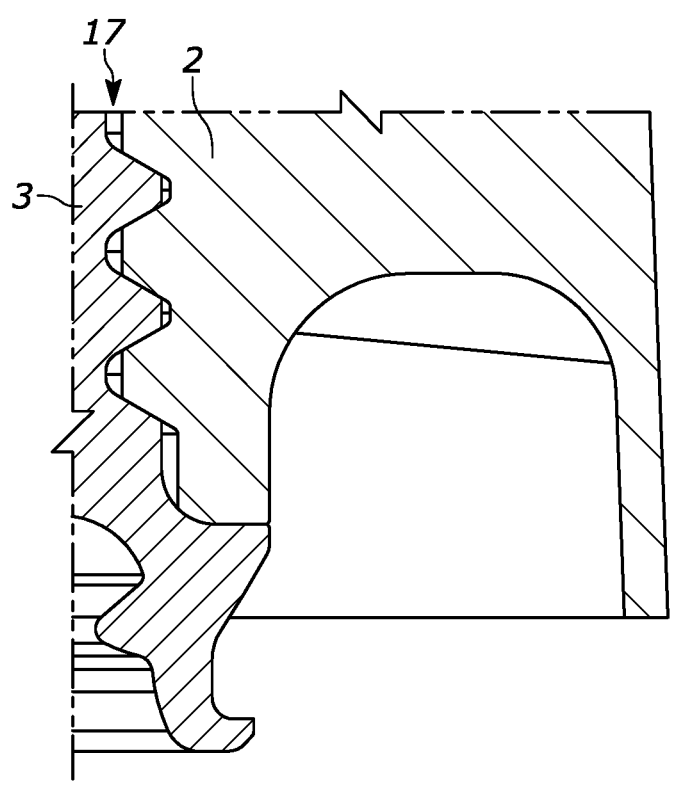

FIG. 1A is an enlarged detail view of the spring strut of FIG. 1. Upper housing member 2 and lower housing member 3 are shown here mutually connected via a threaded connection 17.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 Spring strut support mount
2 Upper housing member
3 Lower housing member
4 Lower end of the housing member 2
5 Detent profile of the upper housing member 2
6 Upper end of the housing member 3
7 Detent profile of the housing member 3
8 Lug of the detent profile 7
9 Slope of the lug 8
10 Steep face of the lug 8
11 Sloping flank of the detent profile 5
12 Slope of the detent profile 5
13 Detent groove of the detent profile 5

What is claimed is:

1. A spring strut support mount including a housing having first and second housing members that can be screwed together in an axial direction to form a threaded connection, the spring strut support mount further comprising:

a detent arrangement permitting a screwing action in said axial direction and preventing a loosening of said threaded connection in a second direction of rotation opposite said axial direction of rotation;

said first and second housing members conjointly defining an interface;

said detent arrangement being disposed at said interface and being a two-part detent arrangement including a first part on one of said first and second housing members and a second part on an other one of said first and second housing members;

said first part including a first periphery at said interface and a lug having a predetermined peripheral shape and said lug being disposed on said first periphery directed toward said second part;

said second part including a second periphery at said interface and having first and second grooves formed in said second periphery arranged one behind an other along said second periphery with said first and second grooves being acted upon by said lug in response to a rotation of said housing members relative to each other;

said first groove being defined by a first flank having a first slope and a second flank having a second slope opposite to said first slope;

said second groove being a detent groove defining a shape corresponding at least in part to said peripheral shape of said lug;

said first and second parts of said two-part detent arrangement being matched to each other so as to cause said lug to successively contact and engage said first and second flanks and then slip into said detent groove as said first and second housing members are rotated relative to each other in said axial direction of rotation when assembling the spring strut support mount; and, said detent groove and said lug conjointly defining a steep slope interface so as to permanently prevent the rotation of said first and second housing members relative to each other in said second direction of rotation thereby preventing a loosening of the threaded connection.

2. The spring strut support mount of claim 1, wherein the first and second housing members include a damping element clamped between the first housing member and the second housing member.

3. The spring strut support mount of claim 1, wherein the first housing member and the second housing member have an elasticity that permits movement of the first housing member and the second housing member in the axial direction.

4. The spring strut support mount of claim 1, wherein the lug has a steep slope in the axial direction and a second slope in the second direction.

5. In a spring strut support mount including a housing having first and second housing members that can be screwed together in an axial direction to form a threaded connection, a detent arrangement permitting a screwing action in said axial direction of rotation and preventing a loosening of said threaded connection in a second direction of rotation opposite said axial direction of rotation; the detent arrangement comprising:

an interface conjointly defined by said first and second housing members;

a first part on one of said first and second housing members and a second part on an other one of said first and second housing members;

said first part including a first periphery at said interface and a lug having a predetermined peripheral shape and said lug being disposed on said first periphery directed toward said second part;

said second part including a second periphery at said interface and having first and second grooves formed in said second periphery arranged one behind an other along said second periphery with said first and second grooves being acted upon by said lug in response to a rotation of said housing members relative to each other;

said first groove being defined by a first flank having a first slope corresponding to said thread pitch and a second flank having a second slope opposite to said first slope;

said second groove being a detent groove defining a shape corresponding at least in part to said peripheral shape of said lug;

said first and second parts of said two-part detent arrangement being matched to each other so as to cause said lug to successively contact and engage said first and second flanks and then slip into said detent groove as said first and second housing members are rotated relative to each other in said axial direction of rotation when assembling the spring strut support mount; and, said detent groove and said lug conjointly defining a steep slope interface so as to permanently prevent the rotation of said first and second housing members relative to each other in said second direction of rotation thereby preventing a loosening of the threaded connection.

* * * * *